US012574258B2

(12) United States Patent
Chen et al.

(10) Patent No.: US 12,574,258 B2
(45) Date of Patent: Mar. 10, 2026

(54) PUBLICLY VERIFIABLE ENCRYPTION

(71) Applicant: Coinbase, Inc., Oakland, CA (US)

(72) Inventors: Yi-Hsiu Chen, San Francisco, CA (US); Samuel Ranellucci, Montreal (CA); Iftach Haitner, Ramat Hasharon (IL); Arash Afshar, Calgary (CA)

(*) Notice: Subject to any disclaimer, the term of this patent is extended or adjusted under 35 U.S.C. 154(b) by 348 days.

(21) Appl. No.: 18/372,051

(22) Filed: Sep. 22, 2023

(65) Prior Publication Data

US 2025/0106046 A1 Mar. 27, 2025

(51) Int. Cl.
H04L 29/06 (2006.01)
H04L 9/08 (2006.01)
H04L 9/32 (2006.01)

(52) U.S. Cl.
CPC .......... H04L 9/3271 (2013.01); H04L 9/0819 (2013.01)

(58) Field of Classification Search
None
See application file for complete search history.

(56) References Cited

U.S. PATENT DOCUMENTS

| | | | | | |
|---|---|---|---|---|---|
| 10,833,871 | B2 * | 11/2020 | Ranellucci | ............ | H04L 9/3255 |
| 10,846,372 | B1 * | 11/2020 | Jayachandran | ....... | H04L 9/3239 |
| 12,401,530 | B2 * | 8/2025 | Stock | ......................... | H04L 9/50 |
| 2001/0038696 | A1 * | 11/2001 | Frankel | ................. | H04L 9/3093 |
| | | | | | 380/286 |
| 2010/0185863 | A1 * | 7/2010 | Rabin | .................... | H04L 9/085 |
| | | | | | 380/278 |

| | | | | | |
|---|---|---|---|---|---|
| 2020/0153622 | A1 * | 5/2020 | Lindell | ................. | H04L 9/0861 |
| 2020/0153640 | A1 * | 5/2020 | Ranellucci | ........... | H04L 9/3255 |
| 2020/0322132 | A1 * | 10/2020 | Covaci | .................. | H04L 9/0637 |
| 2020/0351098 | A1 * | 11/2020 | Wentz | ................... | H04L 9/3247 |
| 2023/0230066 | A1 * | 7/2023 | Jakobsson | .......... | G06Q 20/3829 |
| | | | | | 705/67 |

(Continued)

FOREIGN PATENT DOCUMENTS

| | | | | | |
|---|---|---|---|---|---|
| WO | WO-2023132791 | A2 * | 7/2023 | ............. | G06N 3/098 |
| WO | WO-2025212130 | A2 * | 10/2025 | | |

OTHER PUBLICATIONS

Jiaheng Zhang et al., "Polynomial Commitment with a One-to-Many Prover and Applications", 31st USENIX Security Symposium (USENIX Security 22), Aug. 2022, pp. 2965-2982. (Year: 2022).*

(Continued)

*Primary Examiner* — Jeffery L Williams
(74) *Attorney, Agent, or Firm* — Holland & Hart LLP

(57) ABSTRACT

Methods, systems, and devices for data management are described. A server may receive a plurality of parts of a secret from a computing device, where the plurality of parts may be individually encrypted and individually associated with respective public parts. The server may transmit a random challenge to the computing device. The computing device may transmit, to the server, a subset of parts in a decrypted state. The server may determine, using the subset of decrypted parts and a corresponding subset of respective public parts, that the subset of decrypted parts corresponds to a polynomial function with a degree corresponding to a quantity of parts in the subset of decrypted parts. The server may verify that the individually encrypted plurality of parts corresponds to a secret based on determining that the subset of decrypted parts corresponds to the polynomial function.

20 Claims, 9 Drawing Sheets

(56) References Cited

U.S. PATENT DOCUMENTS

| | | | | |
|---|---|---|---|---|
| 2023/0412398 | A1* | 12/2023 | Sarkar | G06Q 20/3674 |
| 2023/0421375 | A1* | 12/2023 | Savanah | H04L 9/3236 |
| 2024/0204991 | A1* | 6/2024 | Patel | H04L 9/0869 |
| 2024/0354753 | A1* | 10/2024 | Ness | G06Q 20/3827 |
| 2025/0104028 | A1* | 3/2025 | Jakobsen | G06Q 20/02 |
| 2025/0106046 | A1* | 3/2025 | Chen | H04L 9/0819 |
| 2025/0124429 | A1* | 4/2025 | Galansky | H04L 9/0894 |
| 2025/0173721 | A1* | 5/2025 | Wu | H04L 9/50 |

OTHER PUBLICATIONS

A. Tomescu et al., "Towards Scalable Threshold Cryptosystems," 2020 IEEE Symposium on Security and Privacy (SP), San Francisco, CA, USA, 2020, pp. 877-893, doi: 10.1109/SP40000.2020. 00059. (Year: 2020).*

P. Feldman, "A practical scheme for non-interactive verifiable secret sharing," 28th Annual Symposium on Foundations of Computer Science (sfcs 1987), Los Angeles, CA, USA, 1987, pp. 427-438, doi: 10.1109/SFCS.1987.4. (Year: 1987).*

Jian-wei, Ye & Xu-lu, Jiao & Yong-zheng, Zhang. (2009). Verifiable Threshold Secret Sharing and Full Fair Secure Two-Party Computation. 78-83. 10.1109/AST.2009.21. (Year: 2009).*

Afshar, A., Mohassel, P., Pinkas, B., Riva, B. (2014). Non-Interactive Secure Computation Based on Cut-and-Choose. In: Nguyen, P.Q., Oswald, E. (eds) Advances in Cryptology— EUROCRYPT 2014. EUROCRYPT 2014. Lecture Notes in Computer Science, vol. 8441. Springer, Berlin, Heidelberg. (Year: 2014).*

Lindell. "Secure Two-Party Computation via Cut-and-Choose Oblivious Transfer." Journal of cryptology: the journal of the International Association for Cryptologic Research. 25.4 (2012): p. 680. (Year: 2012).*

Lindell et al., "Unbound blockchain-crypto-mpc Library", White Paper, Unbound, Jul. 15, 2019, p. 1-19. (Year: 2019).*

Applebaum, B. (2017). Garbled Circuits as Randomized Encodings of Functions: a Primer. In: Lindell, Y. (eds) Tutorials on the Foundations of Cryptography. Information Security and Cryptography. Springer. p. 1-44. (Year: 2017).*

Lindell, Y. (2017). How to Simulate It—A Tutorial on the Simulation Proof Technique. In: Lindell, Y. (eds) Tutorials on the Foundations of Cryptography. Information Security and Cryptography. Springer, Cham., p. 277-346. (Year: 2017).*

Lindell, Y., "Cryptography and MPC in Coinbase Wallet as a Service (WaaS)", Coinbase, Jun. 15, 2023, p. 1-19. (Year: 2023).*

Lindell, Y., "Publicly Verifiable Backup of Signing Keys", Medium. com, Jan. 7, 2020, p. 1-9, https://medium.com/@yehudalindell/publicly-verifiable-backup-of-signing-keys-390c26593. (Year: 2020).*

Yehuda Lindell and Ariel Nof. 2018. Fast Secure Multiparty ECDSA with Practical Distributed Key Generation and Applications to Cryptocurrency Custody. In Proc. of 2018 ACM SIGSAC Conf. on Computer and Communications Security (CCS '18). Association for Computing Machinery, New York, NY.p. 1837-1854. (Year: 2018).*

Lindell, Y., "Preventing loss of crypto assets with publicly verifiable encryption and backup", Coinbase, Mar. 8, 2023, p. 1-5, www. coinbase.com/en-gb/blog/preventing-loss-of-crypto-assets-with-publicly-verifiable-encryption-and. (Year: 2023).*

* cited by examiner

205
Server
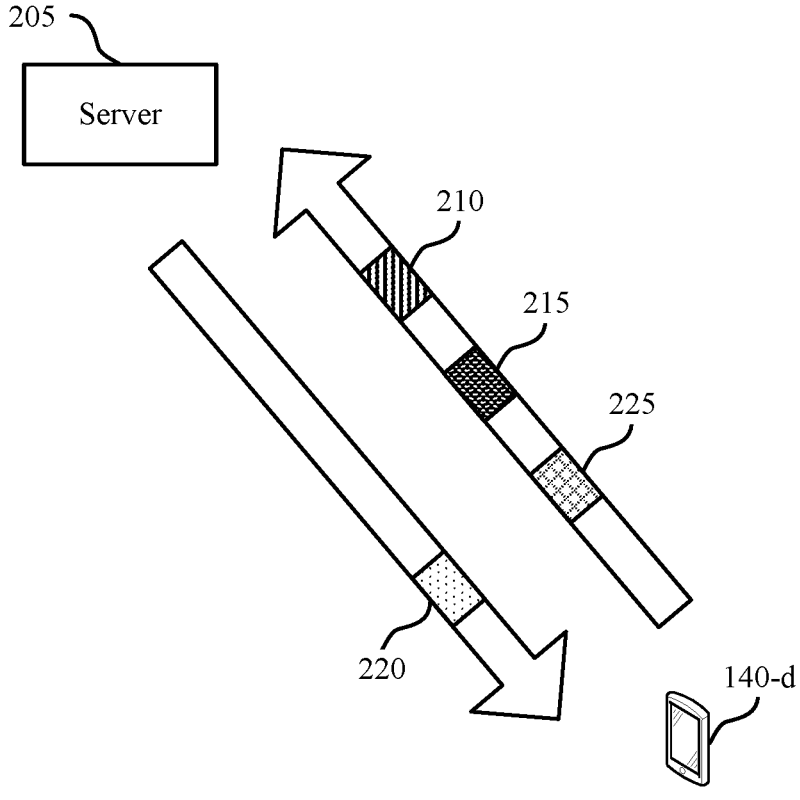
210
215
225
220
140-d
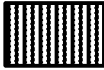 Request to Backup Secret
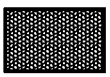 Encrypted Set of Parts
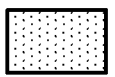 Random Challenge
 Decrypted Subset of Parts
 200
FIG. 2

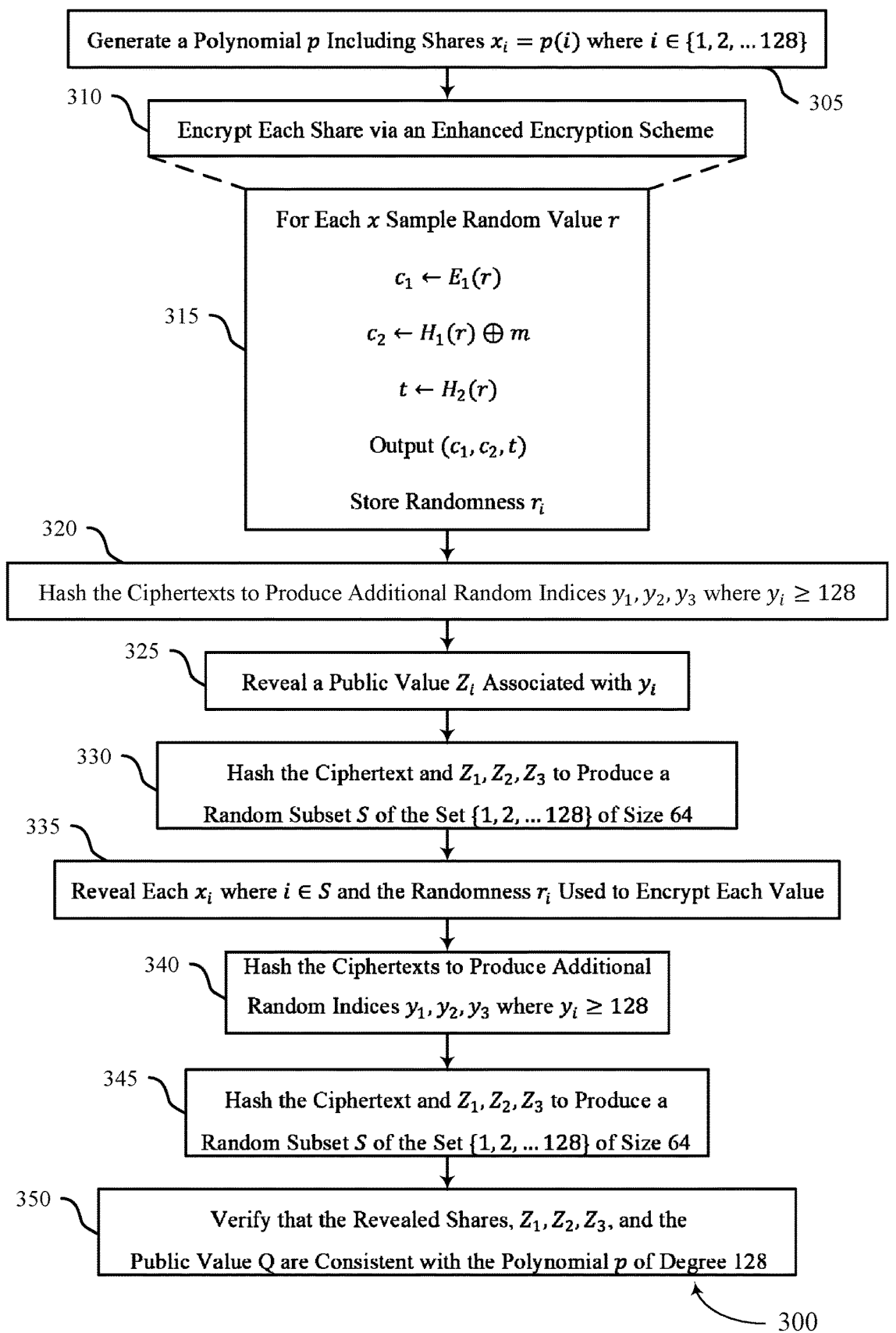

Generate a Polynomial $p$ Including Shares $x_i = p(i)$ where $i \in \{1, 2, \ldots 128\}$

305

310

Encrypt Each Share via an Enhanced Encryption Scheme

315

For Each $x$ Sample Random Value $r$ $c_1 \leftarrow E_1(r)$ $c_2 \leftarrow H_1(r) \oplus m$ $t \leftarrow H_2(r)$ Output $(c_1, c_2, t)$ Store Randomness $r_i$

320

Hash the Ciphertexts to Produce Additional Random Indices $y_1, y_2, y_3$ where $y_i \geq 128$

325

Reveal a Public Value $Z_i$ Associated with $y_i$

330

Hash the Ciphertext and $Z_1, Z_2, Z_3$ to Produce a
Random Subset $S$ of the Set $\{1, 2, \ldots 128\}$ of Size 64

335

Reveal Each $x_i$ where $i \in S$ and the Randomness $r_i$ Used to Encrypt Each Value

340

Hash the Ciphertexts to Produce Additional
Random Indices $y_1, y_2, y_3$ where $y_i \geq 128$

345

Hash the Ciphertext and $Z_1, Z_2, Z_3$ to Produce a
Random Subset $S$ of the Set $\{1, 2, \ldots 128\}$ of Size 64

350

Verify that the Revealed Shares, $Z_1, Z_2, Z_3$, and the
Public Value $Q$ are Consistent with the Polynomial $p$ of Degree 128

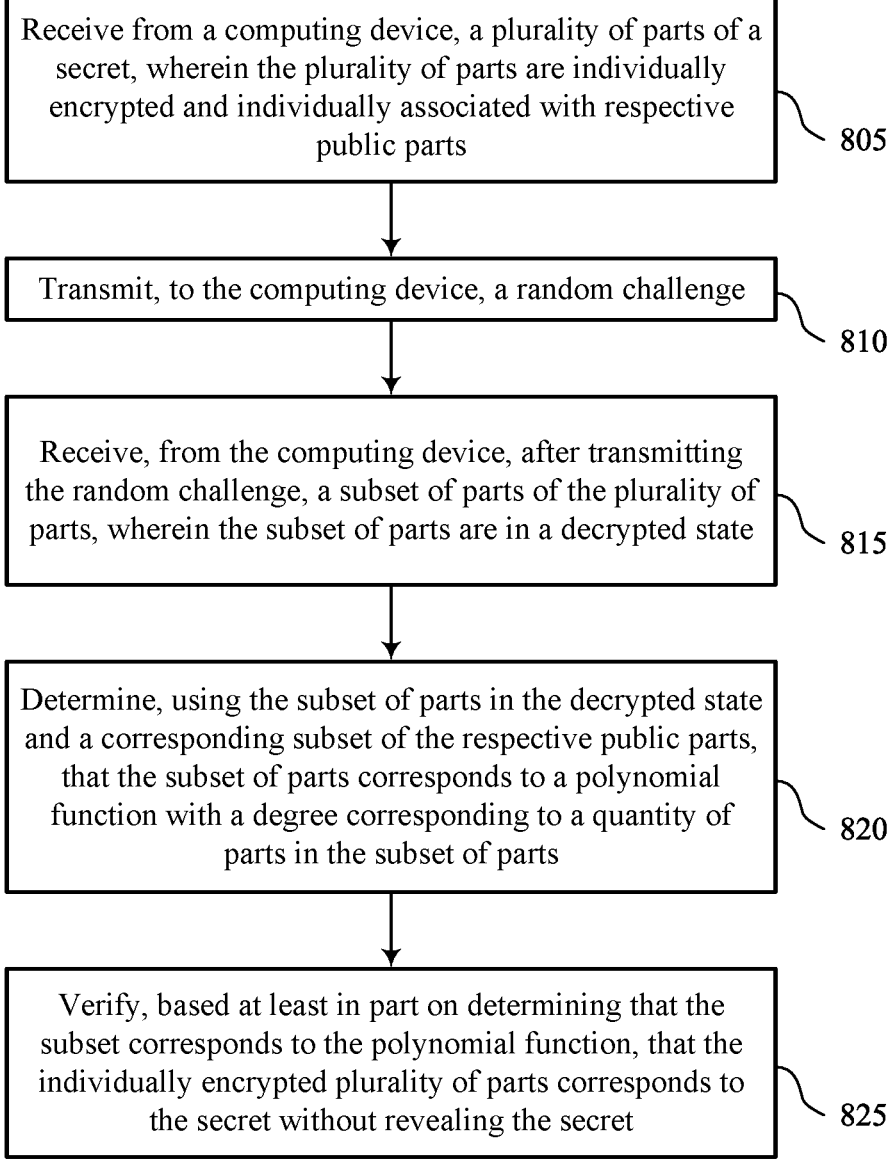

Receive from a computing device, a plurality of parts of a secret, wherein the plurality of parts are individually encrypted and individually associated with respective public parts ⟍ 805

Transmit, to the computing device, a random challenge ⟍ 810

Receive, from the computing device, after transmitting the random challenge, a subset of parts of the plurality of parts, wherein the subset of parts are in a decrypted state ⟍ 815

Determine, using the subset of parts in the decrypted state and a corresponding subset of the respective public parts, that the subset of parts corresponds to a polynomial function with a degree corresponding to a quantity of parts in the subset of parts ⟍ 820

Verify, based at least in part on determining that the subset corresponds to the polynomial function, that the individually encrypted plurality of parts corresponds to the secret without revealing the secret ⟍ 825

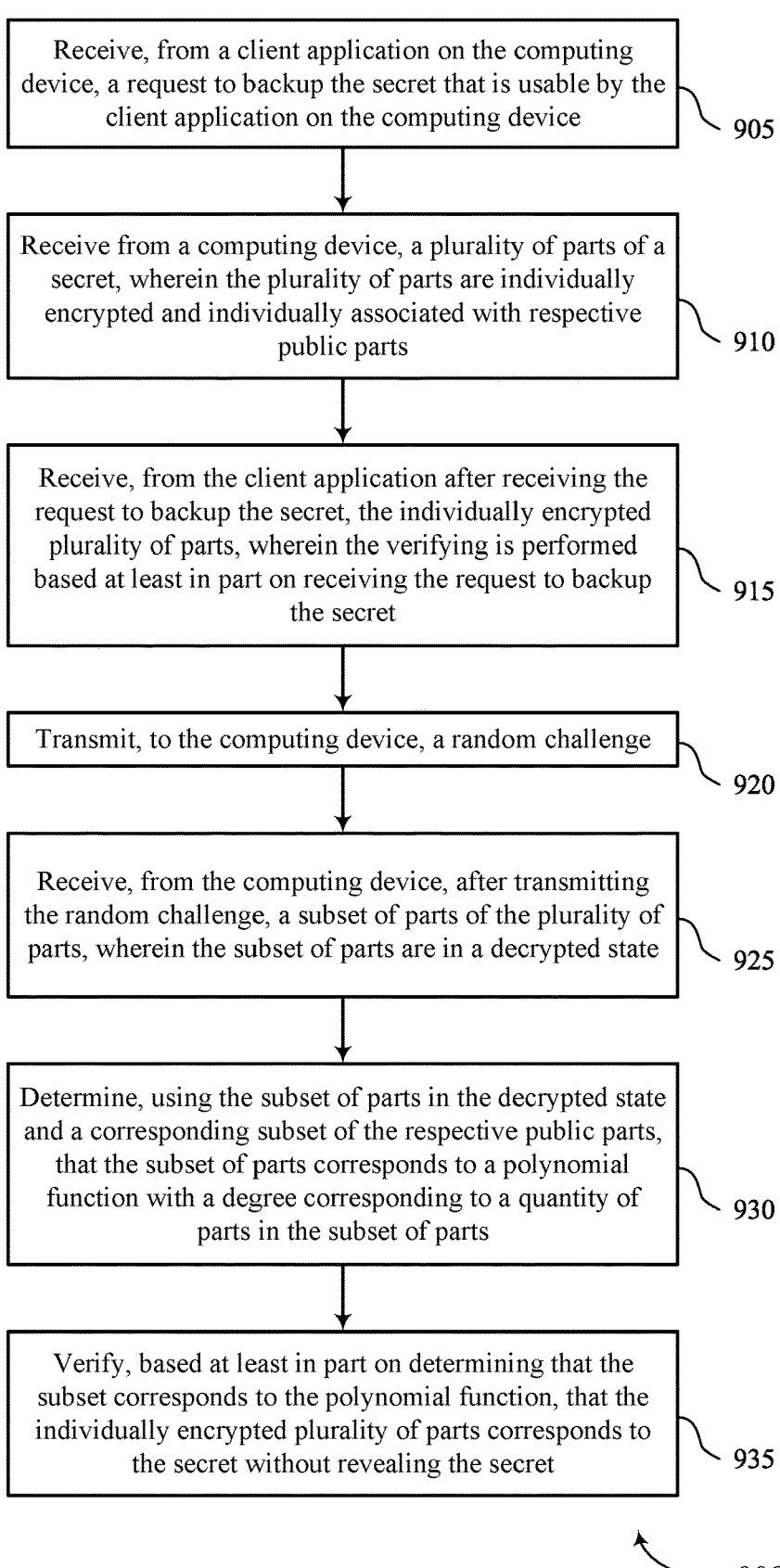

Receive, from a client application on the computing device, a request to backup the secret that is usable by the client application on the computing device ⟍ 905

Receive from a computing device, a plurality of parts of a secret, wherein the plurality of parts are individually encrypted and individually associated with respective public parts ⟍ 910

Receive, from the client application after receiving the request to backup the secret, the individually encrypted plurality of parts, wherein the verifying is performed based at least in part on receiving the request to backup the secret ⟍ 915

Transmit, to the computing device, a random challenge ⟍ 920

Receive, from the computing device, after transmitting the random challenge, a subset of parts of the plurality of parts, wherein the subset of parts are in a decrypted state ⟍ 925

Determine, using the subset of parts in the decrypted state and a corresponding subset of the respective public parts, that the subset of parts corresponds to a polynomial function with a degree corresponding to a quantity of parts in the subset of parts ⟍ 930

Verify, based at least in part on determining that the subset corresponds to the polynomial function, that the individually encrypted plurality of parts corresponds to the secret without revealing the secret ⟍ 935

PUBLICLY VERIFIABLE ENCRYPTION

FIELD OF TECHNOLOGY

The present disclosure relates generally to data management, including techniques for publicly verifiable encryption.

BACKGROUND

Blockchains and related technologies may be employed to support recordation of ownership of digital assets, such as cryptocurrencies, fungible tokens, non-fungible tokens (NFTs), and the like. Generally, peer-to-peer networks support transaction validation and recordation of transfer of such digital assets on blockchains. Various types of consensus mechanisms may be implemented by the peer-to-peer networks to confirm transactions and to add blocks of transactions to the blockchain networks. Example consensus mechanisms include the proof-of-work consensus mechanism implemented by the Bitcoin network and the proof-of-stake mechanism implemented by the Ethereum network. Some nodes of a blockchain network may be associated with a digital asset exchange, which may be accessed by users to trade digital assets or trade a fiat currency for a digital asset.

BRIEF DESCRIPTION OF THE DRAWINGS

FIG. 2 shows an example of a computing environment that supports publicly verifiable encryption in accordance with aspects of the present disclosure.

FIG. 3 shows an example of a process flow that supports publicly verifiable encryption in accordance with aspects of the present disclosure.

FIGS. 8 and 9 show flowcharts illustrating methods that support publicly verifiable encryption in accordance with aspects of the present disclosure.

DETAILED DESCRIPTION

Figure 1:
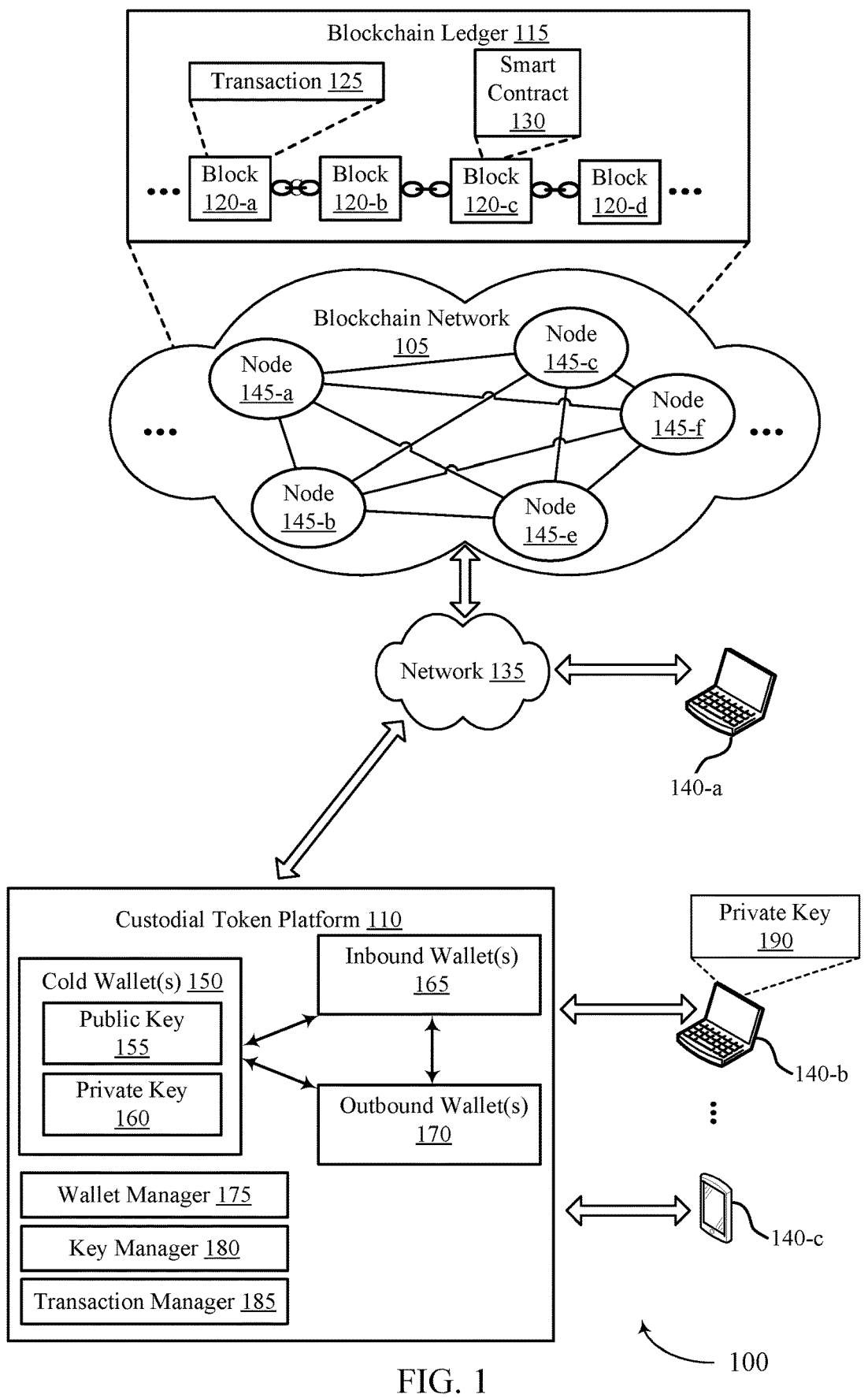
FIG. 1 illustrates an example of a computing environment that supports publicly verifiable encryption in accordance with aspects of the present disclosure.

A client application may use a private key to perform various operations, such as digitally signing transactions or messages. For example, a signed transaction may be broadcast via a blockchain network, and the signature may be used to verify the transaction by computing nodes on the blockchain network. However, maintaining the security of a private key by an end user may be difficult, and users may be subject to misplacing a private key (or a representation thereof, such as mnemonic) or having the private key stolen. Some services may be used to backup private keys. However, it may be difficult to verify that these services have successfully backed up private keys without revealing the private key. That is, to verify the private key backup, it may be required to reveal the backup, which may result in reduced private key security. As described in further detail herein, some techniques may be used to prove and verify a private key (e.g., a backup of the private key) without revealing the private key, but such techniques may be associated with computing and processing inefficiencies. Techniques described herein support public verification of a secret (e.g., a secret value, such as the private key), while reducing or limiting computing and processing overhead. Techniques described herein may be applied to a backup of a private key, a private key share, or the like. For example, techniques described herein may be applied to back up a secret value having a corresponding public value (e.g., a publicly known element).

In some cases, to perform a publicly verifiable backup of a secret, a client application on a computing device may provide two or more parts corresponding to the secret (e.g., a backup of a secret) including a plurality of parts, such as encrypted shares of a private key. In some cases, a server associated with the client application may verify that the two or more parts correspond to a public value associated with the secret. For example, the server may verify that encrypted shares of the private key correspond to a public key based on receipt of the encrypted shares of the private key, based on a request from the user to retrieve the encrypted shares of the private key, or the like.

In some cases, a system (e.g., the server, the computing device, etc.) may verify that the parts of the secret correspond to the public value via a cut-and-choose verification method. The cut-and-choose verification method may involve repeatedly splitting an encrypted value (i.e., "cutting") and encrypting each portion such that many encryptions occur (e.g., 256 encryptions). Thereafter, a large quantity of the portions may be decrypted for verification. However, in order to ensure security of the private value and to support the verification, the process may be iterated. The cut-and-choose verification method may be associated with excessive power and computing consumption at the computing device, the server, or both.

Techniques described herein support public verification of a backup of a secret, while reducing computing consumption relative to cut-and-choose verification and other techniques. For example, in the case of a server performing a backup and proving that the backup is current, the server may receive, from the computing device, a plurality of parts of a secret, and each part may be individually encrypted and individually associated with respective public values (e.g., public key shares of a public key). Based on receiving the plurality of parts, the server may transmit a random challenge to the computing device to support verification that the plurality of parts correspond to the secret. In response to the random challenge, the computing device may select and indicate to the server a subset of decrypted parts. That is, the computing device may decrypt a subset of parts of the plurality of parts and transmit those decrypted parts to the server.

The server may determine, using the subset of parts and a corresponding subset of respective public values, whether the subset of decrypted parts corresponds to a polynomial function. For example, the polynomial function may be associated with a degree corresponding to a quantity of parts in the subset of decrypted parts. The quantity may be a threshold quantity of parts usable to determine that the subset of decrypted parts corresponds to the secret without revealing the secret. That is, the secret may be revealed if the threshold quantity is exceeded. The server may verify that the individually encrypted plurality of parts corresponds to the secret based on determining that the subset corresponds to the polynomial function. The server may verify the individually encrypted plurality of parts without revealing the secret (e.g., based on the threshold quantity of parts being used). As used herein, a "secret" may correspond to a private key, a key share or a key shard of a private key, or another type of secret. A "part" may be portion of the secret (and as such, a key share or shard of a private key). A "public value" may correspond to a share of a public key that is associated with (cryptographically) with the secret. Further, "key share" and "key shard" may be used interchangeably. Additionally, techniques are generally described herein with respect to a server backing up a secret (e.g., a private key) and performing the proof based on the information exchanged with the client, but it should be understood that these techniques may be used in other contexts, such as a client backing up and proving the backup of a secret for a server.

FIG. 1 illustrates an example of a computing environment 100 that supports publicly verifiable encryption in accordance with aspects of the present disclosure. The computing environment 100 may include a blockchain network 105 that supports a blockchain ledger 115, a custodial token platform 110, and one or more computing devices 140, which may be in communication with one another via a network 135.

The network 135 may allow the one or more computing devices 140, one or more nodes 145 of the blockchain network 105, and the custodial token platform 110 to communicate (e.g., exchange information) with one another. The network 135 may include aspects of one or more wired networks (e.g., the Internet), one or more wireless networks (e.g., cellular networks), or any combination thereof. The network 135 may include aspects of one or more public networks or private networks, as well as secured or unsecured networks, or any combination thereof. The network 135 also may include any quantity of communications links and any quantity of hubs, bridges, routers, switches, ports or other physical or logical network components.

Nodes 145 of the blockchain network 105 may generate, store, process, verify, or otherwise use data of the blockchain ledger 115. The nodes 145 of the blockchain network 105 may represent or be examples of computing systems or devices that implement or execute a blockchain application or program for peer-to-peer transaction and program execution. For example, the nodes 145 of the blockchain network 105 support recording of ownership of digital assets, such as cryptocurrencies, fungible tokens, non-fungible tokens (NFTs), and the like, and changes in ownership of the digital assets. The digital assets may be referred to as tokens, coins, crypto tokens, or the like. The nodes 145 may implement one or more types of consensus mechanisms to confirm transactions and to add blocks (e.g., blocks 120-a, 120-b, 120-c, and so forth) of transactions (or other data) to the blockchain ledger 115. Example consensus mechanisms include a proof-of-work consensus mechanism implemented by the Bitcoin network and a proof-of-stake consensus mechanism implemented by the Ethereum network.

When a device (e.g., the computing device 140-a, 140-b, or 140-c) associated with the blockchain network 105 executes or completes a transaction associated with a token supported by the blockchain ledger, the nodes 145 of the blockchain network 105 may execute a transfer instruction that broadcasts the transaction (e.g., data associated with the transaction) to the other nodes 145 of the blockchain network 105, which may execute the blockchain application to verify the transaction and add the transaction to a new block (e.g., the block 120-d) of a blockchain ledger (e.g., the blockchain ledger 115) of transactions after verification of the transaction. Using the implemented consensus mechanism, each node 145 may function to support maintaining an accurate blockchain ledger 115 and prevent fraudulent transactions.

The blockchain ledger 115 may include a record of each transaction (e.g., a transaction 125) between wallets (e.g., wallet addresses) associated with the blockchain network 105. Some blockchains may support smart contracts, such as smart contract 130, which may be an example of a subprogram that may be deployed to the blockchain and executed when one or more conditions defined in the smart contract 130 are satisfied. For example, the nodes 145 of the blockchain network 105 may execute one or more instructions of the smart contract 130 after a method or instruction defined in the smart contract 130 is called by another device. In some examples, the blockchain ledger 115 is referred to as a blockchain distributed data store.

A computing device 140 may be used to input information to or receive information from the custodial token platform 110, the blockchain network 105, or both. For example, a user of the computing device 140-a may provide user inputs via the computing device 140-a, which may result in commands, data, or any combination thereof being communicated via the network 135 to the custodial token platform 110, the blockchain network 105, or both. Additionally, or alternatively, a computing device 140-a may output (e.g., display) data or other information received from the custodial token platform 110, the blockchain network 105, or both. A user of a computing device 140-a may, for example, use the computing device 140-a to interact with one or more user interfaces (e.g., graphical user interfaces (GUIs)) to operate or otherwise interact with the custodial token platform 110, the blockchain network 105, or both.

A computing device 140 and/or a node 145 may be a stationary device (e.g., a desktop computer or access point) or a mobile device (e.g., a laptop computer, tablet computer, or cellular phone). In some examples, a computing device 140 and/or a node 145 may be a commercial computing device, such as a server or collection of servers. And in some examples, a computing device 140 and/or a node 145 may be a virtual device (e.g., a virtual machine).

Some blockchain protocols support layer one and layer two crypto tokens. A layer one token is a token that is supported by its own blockchain protocol, meaning that the layer one token (or a derivative thereof), may be used to pay transaction fees for transacting using the blockchain protocol. A layer two token is a token that is built on top of layer one, for example, using a smart contract 130 or a decentralized application ("Dapp"). The smart contract 130 or decentralized application may issue layer two tokens to various users based on various conditions, and the users may transact using the layer two tokens, but transaction fees may be based on the layer one token (or a derivative thereof).

The custodial token platform 110 may support exchange or trading of digital assets, fiat currencies, or both by users of the custodial token platform 110. The custodial token platform 110 may be accessed via website, web application, or applications that are installed on the one or more computing devices 140. The custodial token platform 110 may be configured to interact with one or more types of blockchain networks, such as the blockchain network 105, to support digital asset purchase, exchange, deposit, and withdrawal.

For example, users may create accounts associated with the custodial token platform 110 such as to support purchasing of a digital asset via a fiat currency, selling of a digital asset via fiat currency, or exchanging or trading of digital assets. A key management service (e.g., a key manager) of the custodial token platform 110 may create, manage, or otherwise use private keys that are associated with user wallets and internal wallets. For example, if a user wishes to withdraw a token associated with the user account to an external wallet address, key manager 180 may sign a transaction associated with a wallet of the user, and broadcast the signed transaction to nodes 145 of the blockchain network 105, as described herein. In some examples, a user does not have direct access to a private key associated with a wallet or account supported or managed by the custodial token platform 110. As such, user wallets of the custodial token platform 110 may be referred to non-custodial wallets or non-custodial addresses.

The custodial token platform 110 may create, manage, delete, or otherwise use various types of wallets to support digital asset exchange. For example, the custodial token platform 110 may maintain one or more internal cold wallets 150. The internal cold wallets 150 may be an example of an offline wallet, meaning that the cold wallet 150 is not directly coupled with other computing systems or the network 135 (e.g., at all times). The cold wallet 150 may be used by the custodial token platform 110 to ensure that the custodial token platform 110 is secure from losing assets via hacks or other types of unauthorized access and to ensure that the custodial token platform 110 has enough assets to cover any potential liabilities. The one or more cold wallets 150, as well as other wallets of the blockchain network 105 may be implemented using public key cryptography, such that the cold wallet 150 is associated with a public key 155 and a private key 160. The public key 155 may be used to publicly transact via the cold wallet 150, meaning that another wallet may enter the public key 155 into a transaction such as to move assets from the wallet to the cold wallet 150. The private key 160 may be used to verify (e.g., digitally sign) transactions that are transmitted from the cold wallet 150, and the digital signature may be used by nodes 145 to verify or authenticate the transaction. Other wallets of the custodial token platform 110 and/or the blockchain network 105 may similarly use aspects of public key cryptography.

The custodial token platform 110 may also create, manage, delete, or otherwise use inbound wallets 165 and outbound wallets 170. For example, a wallet manager 175 of the custodial token platform 110 may create a new inbound wallet 165 for each user or account of the custodial token platform 110 or for each inbound transaction (e.g., deposit transaction) for the custodial token platform 110. In some examples, the custodial token platform 110 may implement techniques to move digital asset between wallets of the digital asset exchange platform. Assets may be moved based on a schedule, based on asset thresholds, liquidity requirements, or a combination thereof. In some examples, movements or exchanges of assets internally to the custodial token platform 110 may be "off-chain" meaning that the transactions associated with the movement of the digital asset are not broadcast via the corresponding blockchain network (e.g., blockchain network 105). In such cases, the custodial token platform 110 may maintain an internal accounting (e.g., ledger) of assets that are associated with the various wallets and/or user accounts.

As used herein, a wallet, such as inbound wallets 165 and outbound wallets 170 may be associated with a wallet address, which may be an example of a public key, as described herein. The wallets may be associated with a private key that is used to sign transactions and messages associated with the wallet. A wallet may also be associated with various user interface components and functionality. For example, some wallets may be associated with or leverage functionality for transmitting crypto tokens by allowing a user to enter a transaction amount, a receiver address, etc. into a user interface and clicking or activating a UI component such that the transaction is broadcast via the corresponding blockchain network via a node (e.g., a node 145) associated with the wallet. As used herein, "wallet" and "address" may be used interchangeably.

In some cases, the custodial token platform 110 may implement a transaction manager 185 that supports monitoring of one or more blockchains, such as the blockchain ledger 115, for incoming transactions associated with addresses managed by the custodial token platform 110 and creating and broadcasting on-blockchain transactions when a user or customer sends a digital asset (e.g., a withdrawal). For example, the transaction manager 185 may monitor the addressees of the customers for transfer of layer one or layer two tokens supported by the blockchain ledger 115 to the addresses managed by the custodial token platform 110. As another example, when a user is withdrawing a digital asset, such as a layer one or layer two token, to an external wallet (e.g., an address that is not managed by the custodial token platform 110 or an address for which the custodial token platform 110 does not have access to the associated private key), the transaction manager 185 may create and broadcast the transaction to one or more other nodes 145 of the blockchain network 105 in accordance with the blockchain application associated with the blockchain network 105. As such, the transaction manager 185, or an associated component of the custodial token platform 110 may function as a node 145 of the blockchain network 105.

As described herein, the custodial token platform may implement and support various wallets including the inbound wallets 165, the outbound wallets 170, and the cold wallets 150. Further, the custodial token platform 110 may implement techniques to maintain and manage balances of the various wallets. In some examples, the balances of the various wallets are configured to support security and liquidity. For example, the custodial token platform 110 may implement transactions that move crypto tokens between the inbound wallets 165 and the outbound wallets 170. These transactions may be referred to as "flush" transactions and may occur on a periodic or scheduled basis.

As described herein, various transactions may be broadcast to the blockchain ledger 115 to cause transfer of crypto tokens, to call smart contracts, to deploy smart contracts etc. In some examples, these transactions may also be referred to as messages. That is, the custodial token platform 110 may broadcast a message to the blockchain network 105 to cause transfer of tokens between wallets managed by the custodial token platform 110 to cause transfer of tokens from a wallet managed by the custodial token platform 110 to an external wallet, to deploy a smart contract (e.g., a self-executing program), or to call a smart contract.

As described herein, the custodial token platform 110 or another service or system may provide backup services to client systems, such as a computing device 140. For example, the computing device 140-*b* may have access to a secret, such as the private key 190 and use the private key backup service supported by the custodial token platform 110. To support the backup, a client application on the computing device 140-*b* may encrypt and provide, to the backup service, a plurality of encrypted parts of a secret (e.g., such as the private key 190). The backup service may, using the techniques described herein, verify that the encrypted parts correspond to a public value associated with the secret (e.g., a public key corresponding to the private key 190. For example, the server may verify that the encrypted parts correspond to the public value after receipt of the encrypted parts, based on a request from the user to retrieve the encrypted parts, or the like.

After receiving the plurality of encrypted parts, the backup service may transmit a random challenge to the computing device 140-*b*. In accordance with the random challenge, the computing device may select and decrypt a subset of the parts of the private key 190 and provide the parts to the backup service. The backup service may determine, using the subset of decrypted parts and a corresponding subset of respective public parts (e.g., public key shares of the corresponding public key), whether the subset of decrypted parts corresponds to a polynomial function. For example, the polynomial function may be associated with a degree corresponding to a quantity of parts in the subset of decrypted parts. The server may verify that the individually encrypted plurality of parts corresponds to the secret based on determining that the subset corresponds to the polynomial function without revealing the secret.

Accordingly, the custodial token platform 110 or another service may support backup of secrets that are used and maintained on user devices and the techniques described herein may be used to verify that the backup secret corresponds to the secret on the user devices. Additionally, or alternatively, the techniques described herein may be used by the user/user device to verify that the server maintains an accurate backup of the secret. As noted, the techniques described herein may be used in other computing contexts.

FIG. 2 shows an example of a computing environment 200 that supports publicly verifiable encryption in accordance with aspects of the present disclosure.

The computing environment 200 may include a computing device 140-*d*, which may be an example of the computing devices 140-*a*, 140-*b*, or 140-*c* as described with respect to FIG. 1. The computing environment 200 may include a server 205, which may be associated with the custodial token platform 110 as described with reference to FIG. 1. For example, the server 205 may support a secret backup or verification service for the custodial token platform 110 or may be a standalone service separate from the custodial token platform 110. In some cases, the computing device 140-*d* supports an application that is configured to interact with the server 205, the custodial token platform 110, or both. The application may be an example of a wallet application that is used to interact with one or more blockchain networks and store corresponding crypto tokens. For example, the application may generate and/or access a private key to perform various cryptographic operations, as described herein.

The server 205 and the computing device 140-*d* may communicate in order to back up a secret (e.g., a private key, a private key share, etc.) and verify a set of parts (of the secret, such as parts of a private key or parts of a private key share) provided to the server via a client application on the computing device 140-*d*. Accordingly, an encryption scheme that ensures that an encrypted value x (e.g., the secret) has the property that $Q=g^x$ where Q is publicly known (e.g., Q is the public value corresponding to the secret, such as a public key corresponding to a private key). For an example, in the case where a backup is created for the secret x (e.g., at the server), it is desirable that a cryptographic proof is provided to verify that the backup is valid (e.g., the backup matches the publicly known value Q). Therefore, the encrypted backup should be verifiable against the public value without any knowledge of the secret key (x), but the verifier should be convinced that the backup is a backup of x. Publicly verifiable encryption is a term that captures techniques for verifying without revealing the secret.

A publicly verifiable encryption scheme generally involves three parties: sender, receiver, and verifier. In a public key encryption scheme, the sender may send a message m to the receiver by encrypting the message using the receiver's public key pk. This operation is denoted as c=enc(pk, m). The receiver may recover the original message m by decrypting the ciphertext c with its secret sk, which is expressed as m=dec (sk, c). In a verifiable encryption scheme, at least some information about the message m is made public in the form of M-f (m), allowing the receiver to verify the correctness of the received message. The effectiveness of the scheme is dependent on f being a one-way function. Namely, it should be easy to compute M from m, but practically impossible to calculate m from M. In the example above, m is x, M is Q, and $f(m)=g^x$ where $g^x$ is a one-way function. In other words, knowing $g^m$ and g, it is almost impossible to reverse the function to learn its input m. In a publicly verifiable encryption scheme, a third party verifier may confirm that for the given ciphertext c, if the receiver wanted to, the receiver may retrieve m (by m=dec (sk, c)) that corresponds to the public information M associated with the public key pk. Note that the secret sk of the receiver is not known to the verifier, which makes it publicly verifiable.

One example technique for publicly verifiable encryption is the cut-and-choose technique, which is a technique for providing a zero-knowledge proof. The basic idea is for the prover to "split" the statement it wishes to prove into sub-statements that may be verified (in this case, publicly verified). There are two key requirements for these sub-statements:

1. The correctness of the sub-statements implies the correctness of the original statement.
2. Proving one of a subset of the sub-statements may be easy and does not reveal any information about the statement.

In applying a 1-out-of-2 cut-and-choose (i.e., the prover gives two options to the verifier and the verifier verifies one of the options) in the following way assuming that f has the property f(m1)+f(m2)=f(m1+m2) and the message space is in a modular group, the following operations may be performed (e.g., by the sender):

1. Randomly split m such that m=m1+m2
   a. For example, let the modular group be 7. In other words, all the numbers that we will work with will be positive and less than 7 and if they are not, the numbers are converted to the range of 1, . . . , 6 using modulo operation. In considering m=3, to randomly split m, a random number between 1, . . . , 6 is chosen (e.g., 6) and call it m1. m2 is then computed as m2=m−m1 mod 7=3−6 mod 7=−3 mod 7=4. This results in m1=6, m2=4 as a random splitting of m=3 mod 7.
2. Compute c1=enc (pk, m1) and c2=enc (pk, m2), M1=f(m1), M2=f(m2). Publish c1, c2, M1, M2. Note that based on the assumption above f(m1+m2)=f(m1)+f(m2) which implies that M=M1+M2. In this example, "publishing" means that the values are transmitted to or revealed to the verifier.
3. Receive a random challenge b=1 or 2 from a verifier.
4. If b=1, reveal m1 and show that c1 is the encryption of m1. The verifier also verifies that f(m1)=M1 and M=M1+M2.

5. Similarly for the case b=2.

Intuitively, the protocol works because: (1) the statements in step 2 implies the original statement, and (2) knowing one of m1 or m2 reveals nothing about m.

Note that, in the above protocol, the malicious prover may trick the verifier to believe the statement with ½ probability if the malicious prover can guess the challenge correctly. However, if the process is repeated multiple times (e.g., 120 times), the chance that the prover can correctly guess the choice 120 times in a row is very small. As a result, to obtain Publicly Verifiable Encryption using Cut-and-Choose, the above expensive mathematical operations are repeated (e.g., 120 times), which incurs a large overhead. Techniques described herein support the same level of security but with less repetition, which results in a more efficient protocol. The techniques described herein utilize threshold secret sharing and verifiable threshold secret sharing. Threshold secret sharing (e.g., t-out-of-n secret sharing) is a method of securely distributing a secret such that t−1 players have no information about the secret but that t players can reconstruct the secret. Verifiable threshold secret sharing is secret sharing where additional information is provided so that shares may be validated without revealing the secret.

According to techniques described herein, generally, 128 values (e.g., 128 parts of the secret) are encrypted based on a 64-degree sharing polynomial. The verifier randomly chooses 64 of the encrypted parts to open. In this approach, the probability of the sender cheats without getting caught is $1/C$ $(128, 64){\approx}1/2^{120}$, which happens when the sender correctly guesses which 64 values the verifier asks to open. Note that C $(128,64)$ is 128 choose 64 (e.g., $128!/(64!)/(64!))$ In some cases, the algorithm is set for 128 points with the polynomial having a degree of 64. The following operations demonstrate an example with a 4 points and degree of 2:

Sender:
1. Chooses a random polynomial p. of degree 2 such that an evaluation (e.g., the zero-evaluation or p(0)) of the polynomial is the secret. For example, in some cases, a party may use an arbitrary point z such that p(z) corresponds to the secret.

$$p(x) = x^2 + 5x + 7 \bmod 13. \qquad 2.$$

3. Encrypts $p(1)$, . . . $p(4)$. Let c1, . . . . , $c_n$ be the result, where $C1=Enc(p(1))$, $C2=Enc(p(2))$ $C3=Enc(p(3))$, $C4=Enc(p(4))$
4. Publishes $X_i=p(i)G$.

Verifier:
1. Verifies that $X_i=p(i)G$ is consistent with some polynomial of degree 2.
2. Chooses a random subset S of $\{1, . . . , 4\}$ whose size is 2. (e.g., $S=\{1,3\}$)
3. Sends S to the sender.

Prover:
1. Opens p(i) for $i \in S$.

Verifier:
1. Checks that $X_1=p(i)G$ for $i \in S$ (e.g., verify that $X_1=p$ $(1){\cdot}G$ and $X_3=p(3)$ G.

Thus, when using the algorithm with 128 points with a polynomial having a degree of 64, the sender may choose a random polynomial p, with a degree of 64 such that the evaluation of the polynomial is the secret. In such cases, 64 values may be encrypted, and a random subset of S $\{1-128\}$ whose size is 64 would be transmitted to the sender.

In the example of FIG. 2, the sender may correspond to the computing device 140-*d*, and the verifier may correspond to the server 205, and the prover may correspond to the computing device 140-*d*. In the illustrated example, a user may access the application on the user device to back up the secret used by the application, and as such, the computing device 140-*d* may transmit a request 210 to back up a secret. For example, the computing device 140-*d* may transmit the request 210 to back up the secret to the server 205, where the server may support the custodial token platform accessible via the client application on the computing device 140-*d*.

As part of the backup procedure, the computing device 140-*d* may transmit an encrypted set of parts 215 to the server 205 (e.g., $c_1, . . . c_n$ in the example described above). For example, each encrypted secret shard of the encrypted set of parts 215 may be individually encrypted and individually associated with respective public parts (e.g., parts of a public value). In some examples, the computing device 140-*d* may transmit the encrypted set of parts 215 to the server 205 after transmitting the request 210 to back up the secret. Additionally, or alternatively, the computing device 140-*d* may transmit the encrypted set of parts 215 to the server 205 to prove that the secret corresponds to a public value.

In response to receiving the encrypted set of parts 215, the server 205 may transmit a random challenge 220 to the computing device 140-*d*. The random challenge 220 may include a request for the computing device 140-*d* to decrypt a subset of the encrypted set of parts 215. The random challenge may correspond to or be indicative of the subset of encrypted parts 215 that the computing device 140-*d* is to publish (e.g., send to the server 205).

Upon receiving the random challenge 220, the computing device 140-*d* may decrypt a subset of the encrypted set of parts 215 correspond to the random challenge. For example, the computing device 140-*d* may decrypt a quantity of parts corresponding to a degree of a polynomial function. In some examples, the polynomial function may be associated with the random challenge, the publicly-verifiable encryption scheme, or both. Additionally, or alternatively, the degree of the polynomial may be below a threshold, where the threshold corresponds to a quantity of parts usable to verify that the encrypted set of parts 215 corresponds to the polynomial function without revealing the secret.

In some examples, the computing device 140-*d* may transmit the decrypted subset of parts 225 to the server 205. For example, the computing device 140-*d* may transmit the decrypted subset of parts 225 in response to receiving the random challenge 220.

The server 205 may determine that the decrypted subset of parts 225 corresponds to the polynomial function with the degree corresponding to a quantity of parts in the decrypted subset of parts 225. For example, the server 205 may determine that the decrypted subset of parts 225 corresponds to the polynomial function based on receiving the decrypted subset of parts 225.

The server 205 may verify that the encrypted set of parts 215 corresponds to the secret. For example, the server 205 may verify that the encrypted set of parts 215 corresponds to the secret based on determining that the decrypted subset of parts 225 corresponds to the polynomial function. The server 205 may verify the encrypted set of parts 215 without revealing the secret. That is, the decrypted subset may be used to verify that the parts correspond to some polynomial with the degree (e.g., 64) without revealing the zero-evaluation, which correspond to the secret (e.g., the private key).

In some examples, the server 205 may indicate that the parts are verified to the computing device 140-*d*.

As such, these techniques may be used by the server 205 to verify that the parts received from the user device 240-*d* are valid. Additionally, the computing device 140-*d* may implement these techniques to verify that the server 205 maintains an accurate record of the secret.

FIG. 3 shows an example of a process flow 300 that supports publicly verifiable encryption in accordance with aspects of the present disclosure. The process flow 300 may be implemented by a server associated with a client application of a computing device, which may be examples or corresponding devices or systems as described with respect to FIGS. 1 and 2. As described herein, the process flow 300 may correspond to a publicly-verifiable encryption scheme that relies on elliptic curve cryptography. For example, given an elliptic curve with a generator G, the task is how to generate an encryption scheme that allows external parties to verify that the encrypted value y has the property that q·G=Q where Q is some public elliptic curve point. Enhanced secure encryption is a secure encryption technique that meets a strong definition of security, namely equivocality, and a weak form of extractability (namely decryption will fail or the simulator can extract the plaintext that will decrypt). Feldman sharing is a method of sharing a secret associated with a public value that meets the following properties:

1. Each share (e.g., part) is associated with a public value.
    2. The public value cannot be used to recover the share.
    3. A share when revealed can be validated using its associated public value.
    4. We can verify that the public values are consistent with the public value of the secret.

(E1,D1) is denoted as the secure encryption scheme from CCA-secure encryption using secure hash functions. In some examples, the server may verify a set of parts (e.g., encrypted private key shares) received from, for example, a computing device via a publicly-verifiable encryption scheme. The publicly-verifiable encryption scheme may be based on threshold secret sharing. For example, the publicly-verifiable encryption scheme may include a set of users t (e.g., players) where t−1 users may be unable to reconstruct a secret value, but t users are able to reconstruct the secret value.

At 305, the computing device (e.g., a sender/prover) may generate a polynomial p including shares $x_i=p(i)$ where $i \in \{1, 2, \ldots 128\}$. In some examples, a degree of the polynomial p may correspond to the set of shares. Additionally, or alternatively, the shares may correspond to a secret value. For example, the secret value may be obtainable via the shares. the secret share Q may be a Feldman-secret share with a degree of 128.

At 310, the computing may encrypt each share via an enhanced encryption scheme. The enhanced encryption scheme may include, at 315, sampling random value r for each x sample. Additionally, or alternatively, the enhanced encryption scheme may include producing a first ciphertext $c_1$, a second ciphertext $c_2$, and a value t, which is an authentication tig that binds the encryptor to the value r. some examples, the server may output ($c_1$, $c_2$, t). Additionally, or alternatively, the server may store randomness $r_i$. The server may determine the first ciphertext $c_1$, the second ciphertext $c_2$, and the value t based on Equation 1, Equation 2, and Equation 3 below.

$$c_1 \leftarrow E_1(r) \quad \text{(1)}$$

$$c_2 \leftarrow H_1(r) \oplus m \quad \text{(2)}$$

$$t \leftarrow H_2(r) \quad \text{(3)}$$

At 320, the computing device may, after receiving a random challenge from the verifier, may hash the ciphertexts (e.g., $c_1$ and $c_2$) to produce additional random elements $y_1$, $y_2$, $y_3$ where $y_i \geq 128$. In some examples, the computing device may input additional random indices $y_1$, $y_2$, and $y_3$ to the polynomial p to generate a set of public values associated with each share. That is, the computing device may provide the additional random indices, which may be encrypted values corresponding to the shares $x_i$. For example, the set of public values may be denoted as $z_i$ where $z_i=p(y_i)$.

At 325, the computing device may reveal (e.g., transmit to the server) the public values $Z_i$ (e.g., $Z_1$, $Z_2$, $Z_3$) associated with each $y_i$. For example, the computing device may reveal one or more public values associated with each encrypted share.

At 330, the computing device (e.g., the prover) may hash the ciphertext and $Z_1$, $Z_2$, $Z_3$ to produce a random subset S of the set $\{1, 2, \ldots 128\}$ of size 64. For example, the computing device may decrypt the public values to reveal the shares $x_i$ corresponding to each public value, each encrypted value, or both.

At 335, the computing device may reveal (e.g., transmit to the server) each $x_i$ where $i \in S$ as well as the randomness $r_i$ used to encrypt each value. For example, the computing device may reveal encrypted shares associated with the polynomial. In some examples, the computing device may reveal a quantity of shares corresponding to a threshold quantity. The threshold quantity may be based on a quantity of shares usable by the server to determine whether the encrypted shares correspond to the public values. One or more revealed shares exceeding the threshold quantity may reveal a secret value associated with the shares.

At 340, the server may hash the ciphertexts to produce additional random indices $y_1$, $y_2$, $y_3$ where $y_1 \geq 128$. For example, the server may hash additional ciphertexts to determine whether each revealed $x_i$ corresponds to y; in accordance with the polynomial.

At 345, the server may hash the ciphertext and $Z_1$, $Z_2$, $Z_3$ to produce a random subset S of the set $\{1, 2, \ldots 128\}$ of size 64. For example, the server may hash additional ciphertexts to determine whether each revealed $x_i$ corresponds to $Z_i$ in accordance with the polynomial.

At 350, the server may verify that the revealed shares, $Z_1$, $Z_2$, $Z_3$, and the public value Q are consistent with the polynomial p of degree 128. For example, the server may verify that the revealed shares correspond to the public values according to the polynomial.

Figure 4:
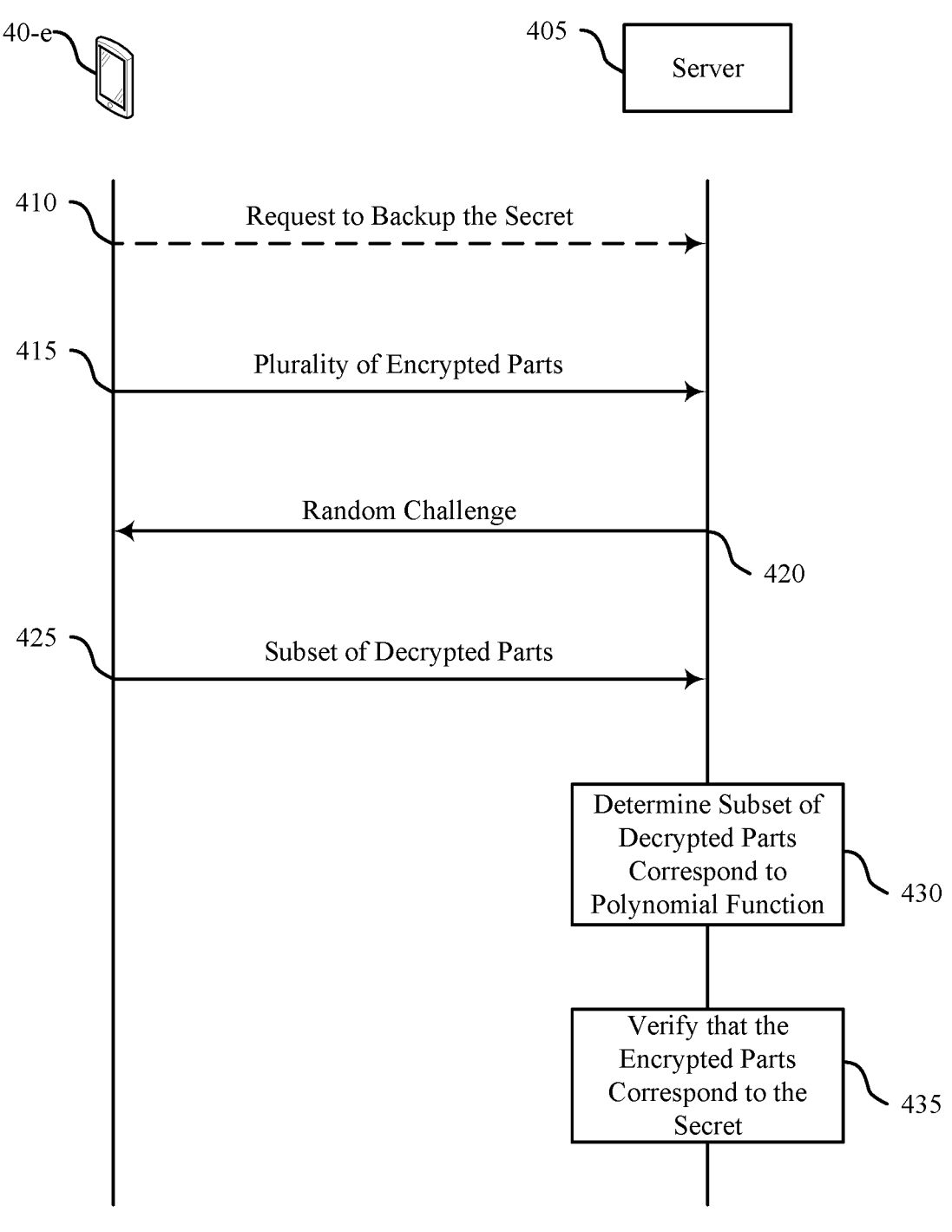
FIG. 4 shows an example of a process flow that supports publicly verifiable encryption in accordance with aspects of the present disclosure.

FIG. 4 shows an example of a process flow 400 that supports publicly verifiable encryption in accordance with aspects of the present disclosure.

The process flow 400 may include a computing device 140-*e*, which may be an example of computing devices as described with reference to FIG. 1 and FIG. 2. The process flow 400 may also include a server 405, which may be an example of the server 205 as described with respect to FIG. 2.

In the following description of the process flow 400, the operations between the computing device 140-*e* and the server 405 may be transmitted in a different order than the example order shown, or the operations performed may be performed in different orders or at different times. Some operations may also be omitted from the process flow 400, and other operations may be added to the process flow 400.

At 410, the server 405 may receive a request to back up a secret. For example, the server 405 may receive the request from a client application on the computing device 140-*e*. The secret, which may be an example of a private key, may be usable by the client application on the computing device 140-*e*. In some examples, the client application may be an application that supports access to a custodial token platform.

At 415, the server 405 may receive a plurality of parts. For example, the server 405 may receive an individually encrypted plurality of parts (e.g., shares of the private key) from the client application on the computing device 140-*e*. In some examples, the server 405 may receive the plurality of individually encrypted parts after receiving the request to back up the secret. Additionally, or alternatively, each of the plurality of parts may be individually encrypted and individually associated with respective public parts. As such, in the example of FIG. 4, the computing device 140-*e* may be an example of a sender or prover, and the server 405 may be an example of a verifier.

At 420, the server 405 may transmit a random challenge to the computing device 140-*e*. For example, the server 405 may transmit the random challenge to verify the plurality of parts. That is, the computing device 140-*e* may respond to the random challenge and the server 405 may determine whether the response is valid in order to verify that the plurality of parts (e.g., the plurality of parts sent to the server 405 at 415) correspond to the secret. In some examples, the random challenge may include a selection of a subset or may be indicative of a selection of the parts in an encrypted state.

At 425, the computing device 140-*e* may transmit the subset of parts to the server 405. For example, the subset of parts may be of the plurality of parts, and the subset of parts may be in a decrypted state. That is, the computing device 140-*e* may receive the random challenge and decrypt the corresponding subset of encrypted parts, and reveal (e.g., transmit) the decrypted parts to the server 405.

At 430, the server 405 may determine that the subset of parts correspond to a polynomial function. For example, the server 405 may use the subset of parts in the decrypted state and a corresponding subset of the respective public parts to determine that the subset of parts corresponds to the polynomial function. In some examples, the polynomial function may have a degree corresponding to a quantity of parts in the subset of parts.

In some examples, the quantity of parts may be a threshold quantity of parts usable to determine that the subset of parts corresponds to the polynomial function. For example, the quantity of parts may be the threshold quantity such that the server 405 may determine that the subset of parts corresponds to the polynomial function without revealing the secret.

Additionally, or alternatively, the quantity may be based on a total quantity of parts in the individually encrypted plurality of parts. For example, the degree of the polynomial function may be based on the total quantity of parts in the individually encrypted plurality of parts.

Additionally, or alternatively, an evaluation of the polynomial function determined using the subset of parts and at least one additional secret shard in the decrypted state may result in the secret. In some examples, the evaluation of the polynomial function corresponding to the secret may be unobtainable using (e.g., only using) the subset of parts in the decrypted state. For example, the verification of the parts may not reveal the secret based on the subset being below a threshold quantity of parts resulting in the secret.

At 435, the server 405 may verify that the plurality of parts correspond to the secret. For example, the server 405 may verify that the individually encrypted plurality of parts corresponds to the secret without revealing the secret. In some examples, the server 405 may verify the individually encrypted plurality of parts based on determining that the subset of parts corresponds to the polynomial function at 430. Additionally, or alternatively, the server 405 may verify the individually encrypted plurality of parts based on receiving the request to back up the secret at 410.

Figure 5:
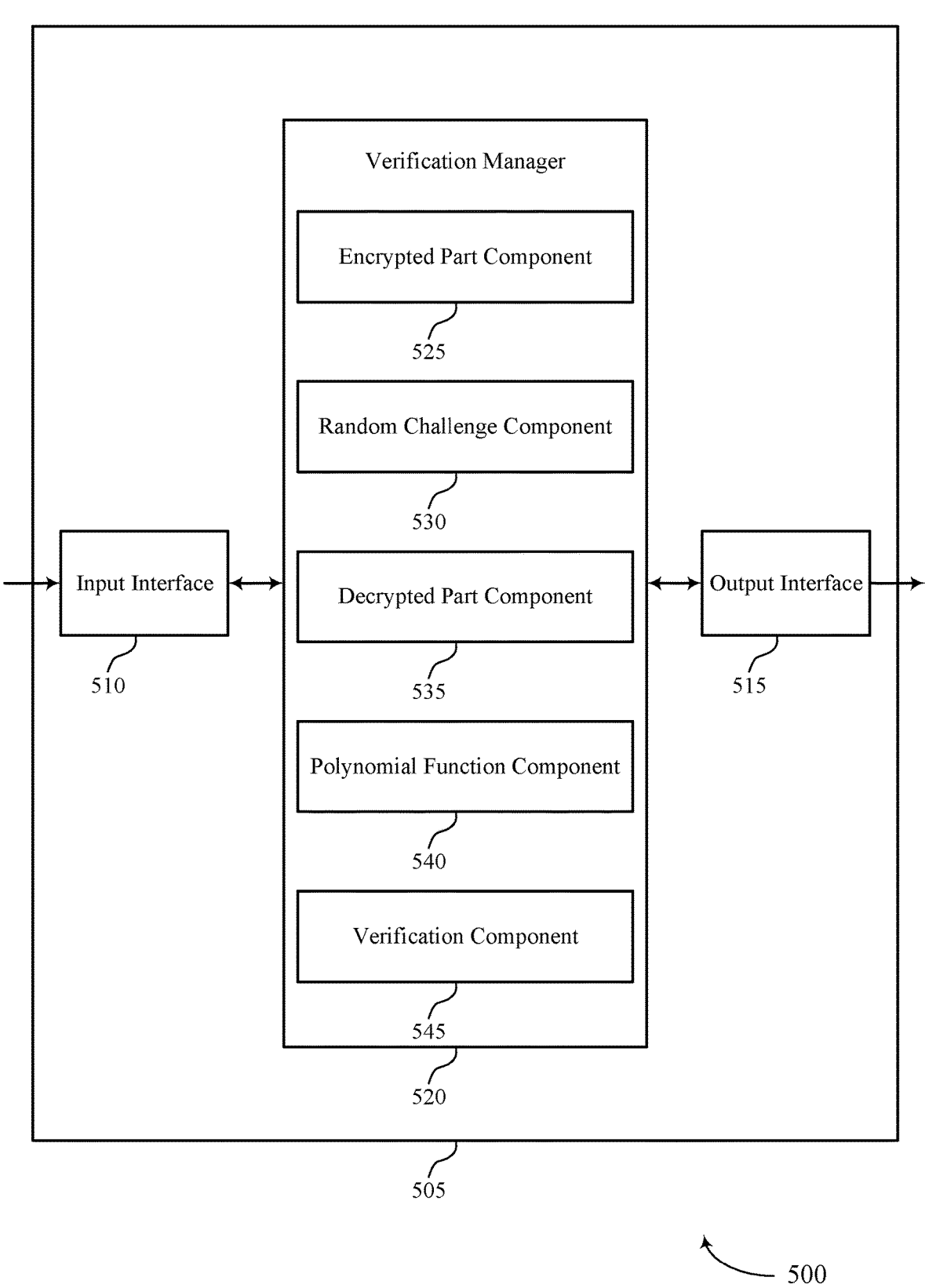
FIG. 5 shows a block diagram of an apparatus that supports publicly verifiable encryption in accordance with aspects of the present disclosure.

FIG. 5 shows a block diagram 500 of a system 505 that supports publicly verifiable encryption in accordance with aspects of the present disclosure. The system 505 may include an input interface 510, an output interface 515, and a verification manager 520. The system 505, or one or more components of the system 505 (e.g., the input interface 510, the output interface 515, and the verification manager 520), may include at least one processor, which may be coupled with at least one memory, to support the described techniques. Each of these components may be in communication with one another (e.g., via one or more buses).

The input interface 510 may manage input signaling for the system 505. For example, the input interface 510 may receive input signaling (e.g., messages, packets, data, instructions, commands, transactions, or any other form of encoded information) from other systems or devices. The input interface 510 may send signaling corresponding to (e.g., representative of or otherwise based on) such input signaling to other components of the system 505 for processing. For example, the input interface 510 may transmit such corresponding signaling to the verification manager 520 to support publicly verifiable encryption. In some cases, the input interface 510 may be a component of a network interface 725 as described with reference to FIG. 7.

The output interface 515 may manage output signaling for the system 505. For example, the output interface 515 may receive signaling from other components of the system 505, such as the verification manager 520, and may transmit such output signaling corresponding to (e.g., representative of or otherwise based on) such signaling to other systems or devices. In some cases, the output interface 515 may be a component of a network interface 725 as described with reference to FIG. 7.

For example, the verification manager 520 may include an encrypted part component 525, a random challenge component 530, a decrypted part component 535, a polynomial function component 540, a verification component 545, or any combination thereof. In some examples, the verification manager 520, or various components thereof, may be configured to perform various operations (e.g., receiving, monitoring, transmitting) using or otherwise in cooperation with the input interface 510, the output interface 515, or both. For example, the verification manager 520 may receive information from the input interface 510, send information to the output interface 515, or be integrated in combination with the input interface 510, the output interface 515, or both to receive information, transmit information, or perform various other operations as described herein.

The verification manager 520 may support key management in accordance with examples as disclosed herein. The encrypted part component 525 may be configured as or otherwise support a means for receiving from a computing device, a plurality of parts of a secret, wherein the plurality of parts are individually encrypted and individually associated with respective public parts. The random challenge component 530 may be configured as or otherwise support a means for transmitting, to the computing device, a random challenge. The decrypted part component 535 may be configured as or otherwise support a means for receiving, from the computing device, after transmitting the random challenge, a subset of parts of the plurality of parts, wherein the subset of parts are in a decrypted state. The polynomial function component 540 may be configured as or otherwise support a means for determining, using the subset of parts in the decrypted state and a corresponding subset of the respective public parts, that the subset of parts corresponds to a polynomial function with a degree corresponding to a quantity of parts in the subset of parts. The verification component 545 may be configured as or otherwise support a means for verifying, based at least in part on determining that the subset corresponds to the polynomial function, that the individually encrypted plurality of parts corresponds to the secret without revealing the secret.

Figure 6:
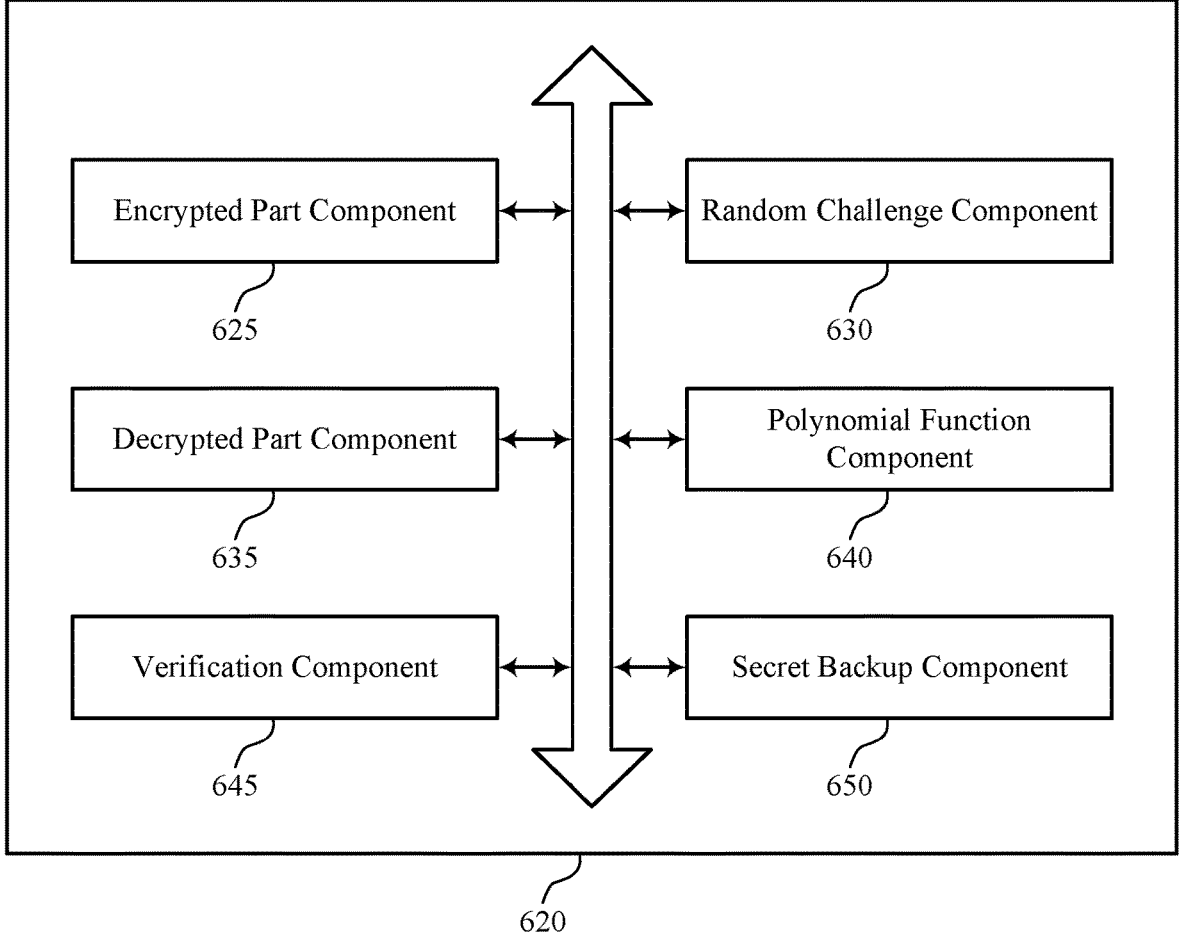
FIG. 6 shows a block diagram of a verification manager that supports publicly verifiable encryption in accordance with aspects of the present disclosure.

FIG. 6 shows a block diagram 600 of a verification manager 620 that supports publicly verifiable encryption in accordance with aspects of the present disclosure. The verification manager 620 may be an example of aspects of a verification manager or a verification manager 520, or both, as described herein. The verification manager 620, or various components thereof, may be an example of means for performing various aspects of publicly verifiable encryption as described herein. For example, the verification manager 620 may include an encrypted part component 625, a random challenge component 630, a decrypted part component 635, a polynomial function component 640, a verification component 645, a secret backup component 650, or any combination thereof. Each of these components, or components of subcomponents thereof (e.g., one or more processors, one or more memories), may communicate, directly or indirectly, with one another (e.g., via one or more buses).

The verification manager 620 may support key management in accordance with examples as disclosed herein. The encrypted part component 625 may be configured as or otherwise support a means for receiving from a computing device, a plurality of parts of a secret, wherein the plurality of parts are individually encrypted and individually associated with respective public parts. The random challenge component 630 may be configured as or otherwise support a means for transmitting, to the computing device, a random challenge. The decrypted part component 635 may be configured as or otherwise support a means for receiving, from the computing device, after transmitting the random challenge, a subset of parts of the plurality of parts, wherein the subset of parts are in a decrypted state. The polynomial function component 640 may be configured as or otherwise support a means for determining, using the subset of parts in the decrypted state and a corresponding subset of the respective public parts, that the subset of parts corresponds to a polynomial function with a degree corresponding to a quantity of parts in the subset of parts. The verification component 645 may be configured as or otherwise support a means for verifying, based at least in part on determining that the subset corresponds to the polynomial function, that the individually encrypted plurality of parts corresponds to the secret without revealing the secret.

In some examples, the quantity is a threshold quantity of parts usable to determine that the subset of parts corresponds to the polynomial function without revealing the secret.

In some examples, a zero-value of the polynomial function determined using the subset of parts and at least one additional part in the decrypted state results in the secret. In some examples, the zero-value corresponding to the secret is unobtainable using only the subset of parts in the decrypted state.

In some examples, the quantity is based at least in part on a total quantity of parts in the individually encrypted plurality of parts.

In some examples, to support receiving the plurality of parts, the secret backup component 650 may be configured as or otherwise support a means for receiving, from a client application on the computing device, a request to back up the secret that is usable by the client application on the computing device. In some examples, to support receiving the plurality of parts, the encrypted part component 625 may be configured as or otherwise support a means for receiving, from the client application after receiving the request to back up the secret, the individually encrypted plurality of parts, wherein the verifying is performed based at least in part on receiving the request to back up the secret.

In some examples, the client application is an application that supports access to a custodial token platform and the verifying is performed on one or more servers supporting the custodial token platform.

In some examples, the random challenge includes a selection of the subset of the parts in an encrypted state.

Figure 7:
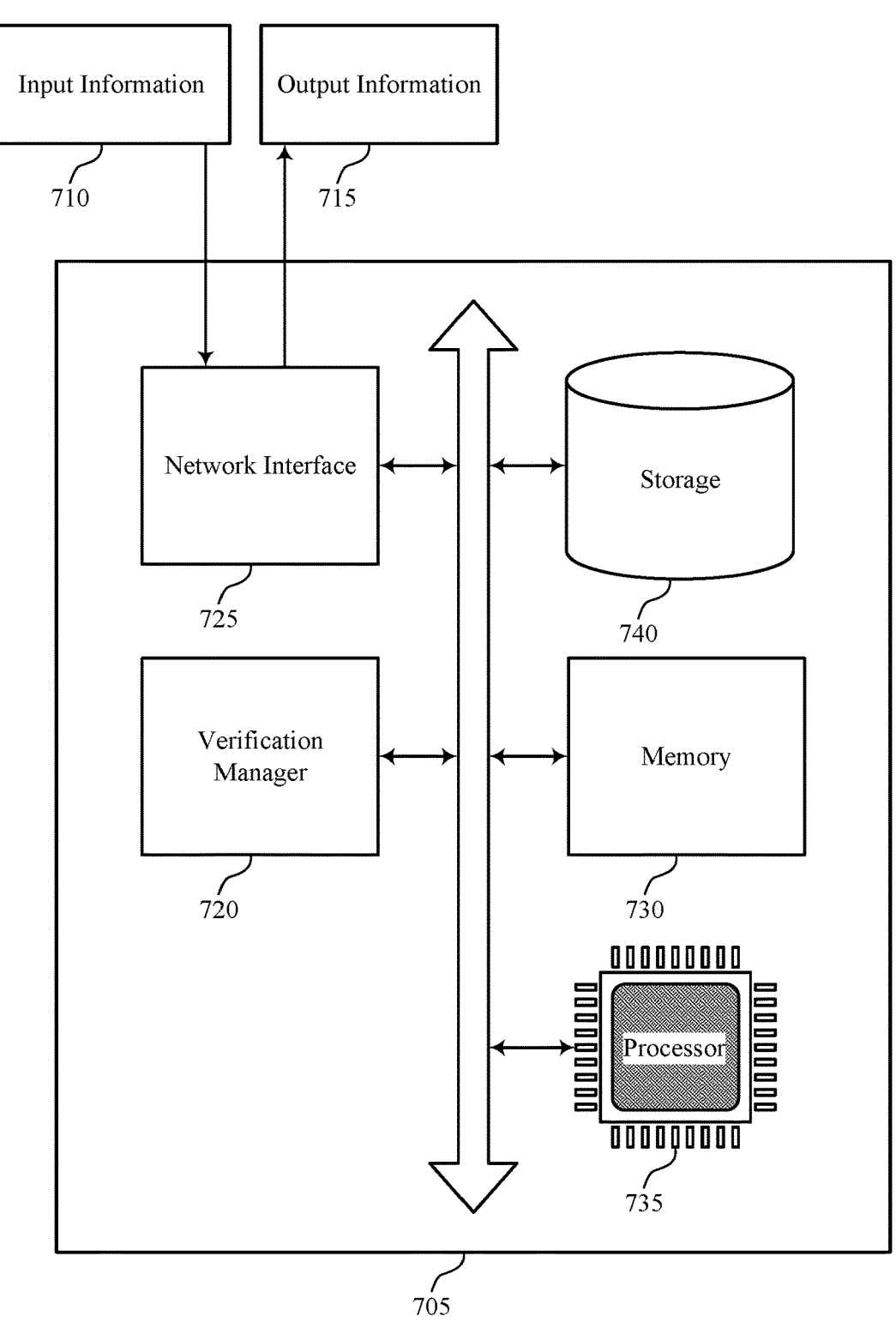
FIG. 7 shows a diagram of a system including a device that supports publicly verifiable encryption in accordance with aspects of the present disclosure.

FIG. 7 shows a diagram of a system 700 including a system 705 that supports publicly verifiable encryption in accordance with aspects of the present disclosure. The system 705 may be an example of or include the components of a system 505 as described herein. The system 705 may include components for key management, transaction management, blockchain communication, and the like, including devices or components such as a verification manager 720, an input information 710, an output information 715, a network interface 725, at least one memory 730, at least one processor 735, and a storage 740. Each of these components may communicate, directly or indirectly, with one another (e.g., via one or more buses, communications links, communications interfaces, or any combination thereof).

The network interface 725 may enable the system 705 to exchange information (e.g., input information 710, output information 715, or both) with other systems or devices (not shown). For example, the network interface 725 may enable the system 705 to connect to a network (e.g., a network 135 as described herein). The network interface 725 may include one or more wireless network interfaces, one or more wired network interfaces, or any combination thereof.

Memory 730 may include RAM, ROM, or both. The memory 730 may store computer-readable, computer-executable software including instructions that, when executed, cause at least one processor 735 to perform various functions described herein, such as functions supporting publicly verifiable encryption. In some cases, the memory 730 may contain, among other things, a basic input/output system (BIOS), which may control basic hardware or software operation such as the interaction with peripheral components or devices. In some cases, the memory 730 may be an example of aspects of one or more components of a custodial token platform 110 as described with reference to FIG. 1. The memory 730 may be an example of a single memory or multiple memories. For example, the system 705 may include one or more memories 730.

The processor 735 may include an intelligent hardware device, (e.g., a general-purpose processor, a DSP, a CPU, a microcontroller, an ASIC, a field programmable gate array (FPGA), a programmable logic device, a discrete gate or transistor logic component, a discrete hardware component, or any combination thereof). The processor 735 may be configured to execute computer-readable instructions stored in at least one memory 730 to perform various functions (e.g., functions or tasks supporting publicly verifiable encryption). Though a single processor 735 is depicted in the example of FIG. 7, it is to be understood that the system 705 may include any quantity of one or more of processors 735 and that a group of processors 735 may collectively perform one or more functions ascribed herein to a processor, such as the processor 735. The processor 735 may be an example of a single processor or multiple processors. For example, the system 705 may include one or more processors 735.

Storage 740 may be configured to store data that is generated, processed, stored, or otherwise used by the system 705. In some cases, the storage 740 may include one or more HDDs, one or more SDDs, or both. In some examples, the storage 740 may be an example of a single database, a distributed database, multiple distributed databases, a data store, a data lake, or an emergency backup database.

The verification manager 720 may support key management in accordance with examples as disclosed herein. For example, the verification manager 720 may be configured as or otherwise support a means for receiving from a computing device, a plurality of parts of a secret, wherein the plurality of parts are individually encrypted and individually associated with respective public parts. The verification manager 720 may be configured as or otherwise support a means for transmitting, to the computing device, a random challenge. The verification manager 720 may be configured as or otherwise support a means for receiving, from the computing device, after transmitting the random challenge, a subset of parts of the plurality of parts, wherein the subset of parts are in a decrypted state. The verification manager 720 may be configured as or otherwise support a means for determining, using the subset of parts in the decrypted state and a corresponding subset of the respective public parts, that the subset of parts corresponds to a polynomial function with a degree corresponding to a quantity of parts in the subset of parts. The verification manager 720 may be configured as or otherwise support a means for verifying, based at least in part on determining that the subset corresponds to the polynomial function, that the individually encrypted plurality of parts corresponds to the secret without revealing the secret.

By including or configuring the verification manager 720 in accordance with examples as described herein, the system 705 may support techniques for improved user experience related to reduced processing, reduced power consumption, more efficient utilization of resources, and improved utilization of processing capability.

FIG. 8 shows a flowchart illustrating a method 800 that supports publicly verifiable encryption in accordance with aspects of the present disclosure. The operations of the method 800 may be implemented by a server or its components as described herein. For example, the operations of the method 800 may be performed by a server as described with reference to FIGS. 1 through 7. In some examples, a server may execute a set of instructions to control the functional elements of the server to perform the described functions. Additionally, or alternatively, the server may perform aspects of the described functions using special-purpose hardware.

At 805, the method may include receiving from a computing device, a plurality of parts of a secret, wherein the plurality of parts are individually encrypted and individually associated with respective public parts. The operations of block 805 may be performed in accordance with examples as disclosed herein. In some examples, aspects of the operations of 805 may be performed by an encrypted part component 625 as described with reference to FIG. 6.

At 810, the method may include transmitting, to the computing device, a random challenge. The operations of block 810 may be performed in accordance with examples as disclosed herein. In some examples, aspects of the operations of 810 may be performed by a random challenge component 630 as described with reference to FIG. 6.

At 815, the method may include receiving, from the computing device, after transmitting the random challenge, a subset of parts of the plurality of parts, wherein the subset of parts are in a decrypted state. The operations of block 815 may be performed in accordance with examples as disclosed herein. In some examples, aspects of the operations of 815 may be performed by a decrypted part component 635 as described with reference to FIG. 6.

At 820, the method may include determining, using the subset of parts in the decrypted state and a corresponding subset of the respective public parts, that the subset of parts corresponds to a polynomial function with a degree corresponding to a quantity of parts in the subset of parts. The operations of block 820 may be performed in accordance with examples as disclosed herein. In some examples, aspects of the operations of 820 may be performed by a polynomial function component 640 as described with reference to FIG. 6.

At 825, the method may include verifying, based at least in part on determining that the subset corresponds to the polynomial function, that the individually encrypted plurality of parts corresponds to the secret without revealing the secret. The operations of block 825 may be performed in accordance with examples as disclosed herein. In some examples, aspects of the operations of 825 may be performed by a verification component 645 as described with reference to FIG. 6.

FIG. 9 shows a flowchart illustrating a method 900 that supports publicly verifiable encryption in accordance with aspects of the present disclosure. The operations of the method 900 may be implemented by a server or its components as described herein. For example, the operations of the method 900 may be performed by a server as described with reference to FIGS. 1 through 7. In some examples, a server may execute a set of instructions to control the functional elements of the server to perform the described functions. Additionally, or alternatively, the server may perform aspects of the described functions using special-purpose hardware.

At 905, the method may include receiving, from a client application on the computing device, a request to back up the secret that is usable by the client application on the computing device. The operations of block 905 may be performed in accordance with examples as disclosed herein. In some examples, aspects of the operations of 905 may be performed by a secret backup component 650 as described with reference to FIG. 6.

At 910, the method may include receiving from a computing device, a plurality of parts of a secret, wherein the plurality of parts are individually encrypted and individually associated with respective public parts. The operations of block 910 may be performed in accordance with examples as disclosed herein. In some examples, aspects of the operations of 910 may be performed by an encrypted part component 625 as described with reference to FIG. 6.

At 915, the method may include receiving, from the client application after receiving the request to back up the secret, the individually encrypted plurality of parts, wherein the verifying is performed based at least in part on receiving the request to back up the secret. The operations of block 915 may be performed in accordance with examples as disclosed herein. In some examples, aspects of the operations of 915 may be performed by an encrypted part component 625 as described with reference to FIG. 6.

At 920, the method may include transmitting, to the computing device, a random challenge. The operations of block 920 may be performed in accordance with examples as disclosed herein. In some examples, aspects of the operations of 920 may be performed by a random challenge component 630 as described with reference to FIG. 6.

At 925, the method may include receiving, from the computing device, after transmitting the random challenge, a subset of parts of the plurality of parts, wherein the subset of parts are in a decrypted state. The operations of block 925 may be performed in accordance with examples as disclosed herein. In some examples, aspects of the operations of 925 may be performed by a decrypted part component 635 as described with reference to FIG. 6.

At 930, the method may include determining, using the subset of parts in the decrypted state and a corresponding subset of the respective public parts, that the subset of parts corresponds to a polynomial function with a degree corresponding to a quantity of parts in the subset of parts. The operations of block 930 may be performed in accordance with examples as disclosed herein. In some examples, aspects of the operations of 930 may be performed by a polynomial function component 640 as described with reference to FIG. 6.

At 935, the method may include verifying, based at least in part on determining that the subset corresponds to the polynomial function, that the individually encrypted plurality of parts corresponds to the secret without revealing the secret. The operations of block 935 may be performed in accordance with examples as disclosed herein. In some examples, aspects of the operations of 935 may be performed by a verification component 645 as described with reference to FIG. 6.

A method for key management by an apparatus is described. The method may include receiving from a computing device, a plurality of parts of a secret, wherein the plurality of parts are individually encrypted and individually associated with respective public parts, transmitting, to the computing device, a random challenge, receiving, from the computing device, after transmitting the random challenge, a subset of parts of the plurality of parts, wherein the subset of parts are in a decrypted state, determining, using the subset of parts in the decrypted state and a corresponding subset of the respective public parts, that the subset of parts corresponds to a polynomial function with a degree corresponding to a quantity of parts in the subset of parts, and verifying, based at least in part on determining that the subset corresponds to the polynomial function, that the individually encrypted plurality of parts corresponds to the secret without revealing the secret.

An apparatus for key management is described. The apparatus may include one or more memories storing processor executable code, and one or more processors coupled with the one or more memories. The one or more processors may individually or collectively operable to execute the code to cause the apparatus to receive from a computing device, a plurality of parts of a secret, wherein the plurality of parts are individually encrypted and individually associated with respective public parts, transmit, to the computing device, a random challenge, receive, from the computing device, after transmitting the random challenge, a subset of parts of the plurality of parts, wherein the subset of parts are in a decrypted state, determine, using the subset of parts in the decrypted state and a corresponding subset of the respective public parts, that the subset of parts corresponds to a polynomial function with a degree corresponding to a quantity of parts in the subset of parts, and verifying, based at least in part on determining that the subset corresponds to the polynomial function, that the individually encrypted plurality of parts corresponds to the secret without revealing the secret.

Another apparatus for key management is described. The apparatus may include means for receiving from a computing device, a plurality of parts of a secret, wherein the plurality of parts are individually encrypted and individually associated with respective public parts, means for transmitting, to the computing device, a random challenge, means for receiving, from the computing device, after transmitting the random challenge, a subset of parts of the plurality of parts, wherein the subset of parts are in a decrypted state, means for determining, using the subset of parts in the decrypted state and a corresponding subset of the respective public parts, that the subset of parts corresponds to a polynomial function with a degree corresponding to a quantity of parts in the subset of parts, and means for verifying, based at least in part on determining that the subset corresponds to the polynomial function, that the individually encrypted plurality of parts corresponds to the secret without revealing the secret.

A non-transitory computer-readable medium storing code for key management is described. The code may include instructions executable by a processor to receive from a computing device, a plurality of parts of a secret, wherein the plurality of parts are individually encrypted and individually associated with respective public parts, transmit, to the computing device, a random challenge, receive, from the computing device, after transmitting the random challenge, a subset of parts of the plurality of parts, wherein the subset of parts are in a decrypted state, determine, using the subset of parts in the decrypted state and a corresponding subset of the respective public parts, that the subset of parts corresponds to a polynomial function with a degree corresponding to a quantity of parts in the subset of parts, and verifying, based at least in part on determining that the subset corresponds to the polynomial function, that the individually encrypted plurality of parts corresponds to the secret without revealing the secret.

In some examples of the method, apparatus, and non-transitory computer-readable medium described herein, the quantity may be a threshold quantity of parts usable to determine that the subset of parts corresponds to the polynomial function without revealing the secret.

In some examples of the method, apparatus, and non-transitory computer-readable medium described herein, a zero-value of the polynomial function determined using the subset of parts and at least one additional part in the decrypted state results in the secret and the zero-value corresponding to the secret may be unobtainable using only the subset of parts in the decrypted state.

In some examples of the method, apparatus, and non-transitory computer-readable medium described herein, the quantity may be based at least in part on a total quantity of parts in the individually encrypted plurality of parts.

In some examples of the method, apparatus, and non-transitory computer-readable medium described herein, receiving the plurality of parts may include operations, features, means, or instructions for receiving, from a client application on the computing device, a request to back up the secret that may be usable by the client application on the computing device and receiving, from the client application after receiving the request to back up the secret, the individually encrypted plurality of parts, wherein the verifying may be performed based at least in part on receiving the request to back up the secret.

In some examples of the method, apparatus, and non-transitory computer-readable medium described herein, the client application may be an application that supports access to a custodial token platform and the verifying may be performed on one or more servers supporting the custodial token platform.

In some examples of the method, apparatus, and non-transitory computer-readable medium described herein, the random challenge includes a selection of the subset of the parts in an encrypted state.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Further, a system as used herein may be a collection of devices, a single device, or aspects within a single device.

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, EEPROM) compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for key management, comprising:
receiving from a computing device, a plurality of parts of a secret, wherein the plurality of parts are individually encrypted and individually associated with respective public parts;
transmitting, to the computing device, a random challenge;
receiving, from the computing device, after transmitting the random challenge, a subset of parts of the plurality of parts, wherein the subset of parts are in a decrypted state;
determining, using the subset of parts in the decrypted state and a corresponding subset of the respective public parts, that the subset of parts corresponds to a polynomial function with a degree corresponding to a quantity of parts in the subset of parts; and
verifying, based at least in part on determining that the subset corresponds to the polynomial function, that the individually encrypted plurality of parts corresponds to the secret without revealing the secret.

2. The method of claim 1, wherein the quantity is a threshold quantity of parts usable to determine that the subset of parts corresponds to the polynomial function without revealing the secret.

3. The method of claim 1, wherein:
an evaluation of the polynomial function determined using the subset of parts and at least one additional part in the decrypted state results in the secret, and
the evaluation of the polynomial function corresponding to the secret is unobtainable using only the subset of parts in the decrypted state.

4. The method of claim 1, wherein the quantity is based at least in part on a total quantity of parts in the individually encrypted plurality of parts.

5. The method of claim 1, wherein receiving the plurality of parts comprises:
receiving, from a client application on the computing device, a request to back up the secret that is usable by the client application on the computing device; and
receiving, from the client application after receiving the request to back up the secret, the individually encrypted plurality of parts, wherein the verifying is performed based at least in part on receiving the request to back up the secret.

6. The method of claim 5, wherein the client application is an application that supports access to a custodial token platform and the verifying is performed on one or more servers supporting the custodial token platform.

7. The method of claim 1, wherein the random challenge includes a selection of the subset of the parts in an encrypted state.

8. An apparatus for key management, comprising:
one or more memories storing processor-executable code; and
one or more processors coupled with the one or more memories and individually or collectively operable to execute the code to cause the apparatus to:
receive from a computing device, a plurality of parts of a secret, wherein the plurality of parts are individually encrypted and individually associated with respective public parts;
transmit, to the computing device, a random challenge;
receive, from the computing device, after transmitting the random challenge, a subset of parts of the plurality of parts, wherein the subset of parts are in a decrypted state;
determine, using the subset of parts in the decrypted state and a corresponding subset of the respective public parts, that the subset of parts corresponds to a polynomial function with a degree corresponding to a quantity of parts in the subset of parts; and
verifying, based at least in part on determining that the subset corresponds to the polynomial function, that the individually encrypted plurality of parts corresponds to the secret without revealing the secret.

9. The apparatus of claim 8, wherein the quantity is a threshold quantity of parts usable to determine that the subset of parts corresponds to the polynomial function without revealing the secret.

10. The apparatus of claim 8, wherein:
an evaluation of the polynomial function determined using the subset of parts and at least one additional part in the decrypted state results in the secret, and
the evaluation of the polynomial function corresponding to the secret is unobtainable using only the subset of parts in the decrypted state.

11. The apparatus of claim 8, wherein the quantity is based at least in part on a total quantity of parts in the individually encrypted plurality of parts.

12. The apparatus of claim 8, wherein, to receive the plurality of parts, the one or more processors are individually or collectively operable to execute the code to cause the apparatus to:
receive, from a client application on the computing device, a request to back up the secret that is usable by the client application on the computing device; and
receive, from the client application after receiving the request to back up the secret, the individually encrypted plurality of parts, wherein the verifying is performed based at least in part on receiving the request to back up the secret.

13. The apparatus of claim 12, wherein the client application is an application that supports access to a custodial token platform and the verifying is performed on one or more servers supporting the custodial token platform.

14. The apparatus of claim 8, wherein the random challenge includes a selection of the subset of the parts in an encrypted state.

15. A non-transitory computer-readable medium storing code for key management, the code comprising instructions executable by one or more processors to:
receive from a computing device, a plurality of parts of a secret, wherein the plurality of parts are individually encrypted and individually associated with respective public parts;

transmit, to the computing device, a random challenge;

receive, from the computing device, after transmitting the random challenge, a subset of parts of the plurality of parts, wherein the subset of parts are in a decrypted state;

determine, using the subset of parts in the decrypted state and a corresponding subset of the respective public parts, that the subset of parts corresponds to a polynomial function with a degree corresponding to a quantity of parts in the subset of parts; and verifying, based at least in part on determining that the subset corresponds to the polynomial function, that the individually encrypted plurality of parts corresponds to the secret without revealing the secret.

16. The non-transitory computer-readable medium of claim 15, wherein the quantity is a threshold quantity of parts usable to determine that the subset of parts corresponds to the polynomial function without revealing the secret.

17. The non-transitory computer-readable medium of claim 15, wherein:

an evaluation of the polynomial function determined using the subset of parts and at least one additional part in the decrypted state results in the secret, and the evaluation of the polynomial function corresponding to the secret is unobtainable using only the subset of parts in the decrypted state.

18. The non-transitory computer-readable medium of claim 15, wherein the quantity is based at least in part on a total quantity of parts in the individually encrypted plurality of parts.

19. The non-transitory computer-readable medium of claim 15, wherein the instructions to receive the plurality of parts are executable by the one or more processors to:

receive, from a client application on the computing device, a request to back up the secret that is usable by the client application on the computing device; and receive, from the client application after receiving the request to back up the secret, the individually encrypted plurality of parts, wherein the verifying is performed based at least in part on receiving the request to back up the secret.

20. The non-transitory computer-readable medium of claim 19, wherein the client application is an application that supports access to a custodial token platform and the verifying is performed on one or more servers supporting the custodial token platform.

* * * * *